(12) United States Patent
Wormsbecker et al.

(10) Patent No.: US 10,703,979 B1
(45) Date of Patent: Jul. 7, 2020

(54) LIQUID YIELD FROM FLUID COKING REACTORS

(71) Applicant: SYNCRUDE CANADA LTD. in trust for the owners of the Syncrude Project as such owners exist now, Fort McMurray (CA)

(72) Inventors: Michael Wormsbecker, Edmonton (CA); Jennifer McMillan, Edmonton (CA); Craig McKnight, Sherwood Park (CA); Jason Wiens, Edmonton (CA)

(73) Assignee: SYNCRUDE CANADA LTD., Fort McMurray (CA)

( * ) Notice: Subject to any disclaimer, the term of this patent is extended or adjusted under 35 U.S.C. 154(b) by 0 days.

(21) Appl. No.: 16/273,950

(22) Filed: Feb. 12, 2019

(51) Int. Cl.
*C10B 55/10* (2006.01)
*C10G 9/32* (2006.01)
*C10G 9/00* (2006.01)

(52) U.S. Cl.
CPC .............. *C10B 55/10* (2013.01); *C10G 9/005* (2013.01); *C10G 9/32* (2013.01); *C10J 2300/0943* (2013.01)

(58) Field of Classification Search
None
See application file for complete search history.

(56) References Cited

U.S. PATENT DOCUMENTS

| 3,671,424 | A | 6/1972 | Saxton |
| 5,714,056 | A | 2/1998 | Hammond et al. |
| 8,435,452 | B2 | 5/2013 | Wyatt, Jr. et al. |
| 2016/0312126 | A1* | 10/2016 | Wormsbecker ........ C10G 9/005 |

FOREIGN PATENT DOCUMENTS

CA 2446889 A1 4/2005

OTHER PUBLICATIONS

Ali, M., Courtney, M., Boddez, L., Gray, M. Coke Yield and Heat Transfer in Reaction of Liquid-Solid Agglomerates of Athabasca Vacuum Residue. The Canadian Journal of Chemical Engineering, vol. 88 (2010) pp. 28-54.
Gray, M., Le, T., Wu, X. Role of Pressure in Coking of Thin Films of Bitumen. The Canadian Journal of Chemical Engineering, vol. 85 (2007) pp. 773-780.
House, P. Interaction of Gas-Liquid Jets with Gas-Solid Fluidized Beds: Effect on Liquid Solid Contact and Impact on Fluid Coker Operation. Chapter 4, PhD Thesis, Western University (2007).
Hulet, Craig & Briens, Cedric, Berruti, Franco and W Chan, Edward. A Review of Short Residence Time Cracking Processes. International Journal of Chemical Reactor Engineering, vol. 3 (2005).
Kumar, D., Muller, C., Pfeifer, R, Wiens, J., McMillan, J., Wormsbecker, M., McKnight, C., Gray, M.R. Role of Liquid Concentration in Coke Yield from Model Vacuum Residue. Coke Agglomerates, Industrial & Engineering Chemistry Research, vol. 54 n. 37 (2015) pp. 9089-9096.

* cited by examiner

*Primary Examiner* — Derek N Mueller
(74) *Attorney, Agent, or Firm* — Bennett Jones LLP

(57) ABSTRACT

The present invention is directed towards modifying the internals of the reactor section of a fluidized coke reactor such that the majority of the hydrocarbon feed will react in the core region of the reactor section and that any hydrocarbon vapour that is produced in the annular region will be released into the core region. Therefore, the present invention reduces the residence time of vapour immediately flashed from the injected hydrocarbon feed, resulting in reduced secondary vapour phase cracking.

7 Claims, 8 Drawing Sheets

LIQUID YIELD FROM FLUID COKING REACTORS

FIELD OF THE INVENTION

This invention relates to a fluid coking apparatus and process for converting a heavy hydrocarbonaceous feedstock to liquid products.

BACKGROUND OF THE INVENTION

Fluidized bed coking (fluid coking) is a petroleum refining process in which heavy petroleum feeds, typically the non-distillable residue (resid) from fractionation or heavy oils are converted to lighter, more useful products by thermal decomposition (coking) at elevated reaction temperatures, typically about 480 to 590° C., (about 900 to 1100° F.) and in most cases from 500 to 550° C. (about 930 to 1020° F.). Heavy oils that may be processed by the fluid coking process include heavy atmospheric resids, vacuum resids, aromatic extracts, asphalts, and bitumen from oil sands.

The process is carried out in a unit with a large reactor vessel containing hot coke particles that are maintained in the fluidized condition at the required reaction temperature with a fluidizing gas (e.g., steam) injected at the bottom of the vessel. The heavy oil feed (e.g., bitumen) is heated to a pumpable temperature, typically in the range of 345 to 400° C. (about 660 to 750° F.), mixed with atomizing steam, and fed through multiple feed nozzles arranged at several successive levels in the reactor. Steam is injected into a stripper section at the bottom of the reactor and passes upwards through the coke particles in the stripper as they descend from the main part of the reactor above. The feed liquid coats the coke particles in the fluidized bed, which make up the emulsion phase of the fluidized bed. As the thermal cracking reactions proceed, the liquid is transformed to vapour, which must migrate from the emulsion phase into the bubble phase in order to exit the system. The hydrocarbon vapours produced from the feed also aid in maintaining the fluidized condition. A layer of coke is formed and deposited on the particles, increasing the average particle size in the fluidized bed. In addition, agglomerates are often formed when several coke particles stick together. In order to maintain the particle size in the fluidized bed, high velocity steam is injected through multiple attrition nozzles that are located just above the stripper section. These high velocity steam jets grind particles together, reducing the size of large particles and agglomerates.

Liquid yields in fluid coking can be increased by reducing the reaction severity, or the time that molecules are exposed to process temperature. The typical approach taken to reduce reactor severity is to reduce reactor temperature. However, the downside of reducing temperature is increased stripper and sore thumb fouling, which can lead to reduced run lengths. Further, reducing the temperature can cause higher levels of wall coke to form, which, again, reduces the run length. Another approach to reduce reactor severity is to decrease the exposure time at high temperatures by providing short vapour phase residence times.

Long hydrocarbon vapour residence times are the most likely contributor to higher than expected "gas make", defined as $C_4$-components, in the fluid coking process. Suppression of feed liquid vapourization, coupled with less than adequate mass transfer between the emulsion and bubble phases, is the most probable mechanism responsible for high "coke make", defined as the toluene insoluble solid by-product of the thermal cracking reaction. Both phenomena result in lower liquid yields, and preliminary estimates suggest that they can contribute to as much as 11 wt % liquid yield loss. Optimizing the rate of removal of vapour from the emulsion phase should reduce the overall hydrocarbon vapour residence time of the reactor, increase liquid yields, and reduce gas make and coke make. It is estimated that a 3-5 wt % liquid yield increase can be achieved through maximizing vapour recovery from the reactor dense bed.

SUMMARY OF THE INVENTION

It has been demonstrated that the fluidized coke bed in the reactor section of a fluid coker is comprised of a solids-dilute, upwardly-flowing stream of vapour in the central (core) region of the reactor section and a downward-flowing, outer (annular) region of particles (coke and hydrocarbons). This has been found to be due to the fact that the steam and vaporized hydrocarbons (hydrocarbon vapour) rises primarily in the core. Thus, the core region has a high vapour (steam rich) and low solids concentration (solids lean) and the annular region has a low vapour (steam poor) and high solids concentration (solids dense). Thus, the core has a strong upflow of high velocity solids (4-6 ft/s) and the annulus has a downward flow of lower velocity solids (1-2 ft/s). Ultimately, the hydrocarbon vapour breaks out of the reactor section and is subsequently converted to a full range of liquid products.

It was discovered by the present applicant that when the hydrocarbon feed is distributed on solids (coke particles) present in the annular region, the feed will be exposed to higher reactor severity, i.e., higher vapour residence time, as it will take time for the liquid to vapourize and the vapour to move to the core in order to exit the dense bed. Thus, product evolved in the annulus would have a relatively long residence time and suffer over-cracking, thereby making gas or causing liquid refluxing to make more coke.

Conventionally, hydrocarbon feed nozzles are positioned closer to the wall of the reactor than the center of the vessel. Thus, conventional feed nozzles are positioned in the annular region and not the core where there is a stronger up flow of well mixed solids. The present applicant has discovered that by having the nozzle tips of feed nozzles extending into the core region of the reactor there is improved steam and feed liquid distribution throughout the reactor region (i.e., in the annulus as well as the core) and therefore improved liquid yields (in particular, heavy gas oil or HGO) and reduced coke yields.

The present invention is directed towards modifying the length of the feed nozzles delivering the hydrocarbon feed into the reactor section of a fluidized coke reactor such that the majority of the hydrocarbon feed will react in the core region of the reactor section and that any hydrocarbon vapour that is produced in the annular region will be released into the core region. Therefore, the present invention reduces the residence time of vapour immediately flashed from the injected hydrocarbon feed, resulting in reduced secondary vapour phase cracking. Further, any vapour generated by cracking of the feed pitch molecules (material that boils above 524° C.) will be preferentially stripped. If the majority of the feed is placed in the core, there will be reduced by-passing of wet solids into the stripper and core of the reactor vessel, as the net flow of solids in the core is upwards. This results in additional solids residence time for wet particles, which would contribute to less liquid carry-under, hence, reduced fouling of stripper and cone internals.

In one aspect of the present invention, a fluidized coke reactor comprising a vertically elongated vessel adapted to house a fluidized bed of heated coke particles in its mid portion, the fluidized bed having a high velocity core region comprising upwardly flowing coke particles and a low velocity annular region comprising downwardly flowing coke particles, is provided for converting a heavy hydrocarbonaceous feedstock to liquid products, further comprising:

a plurality of feed nozzles positioned in the fluidized bed of the vessel and extending into the high velocity core region for delivering the hydrocarbon feedstock into the high velocity core region.

In one embodiment, the fluidized coke reactor further comprises at least one frusto-conical baffle located in the fluidized bed.

In another aspect, a process is provided herein for converting a heavy hydrocarbonaceous feedstock to liquid products, comprising:

introducing the hydrocarbonaceous feedstock into a fluidized bed of heated coke particles, the fluidized bed having a high velocity core region comprising upwardly flowing coke particles and a low velocity annular region comprising downwardly flowing coke particles, the hydrocarbonaceous feedstock being introduced into the high velocity core region of the fluidized bed, and allowing the hydrocarbonaceous feedstock to primarily react with the upwardly flowing coke particles for rapid release of product.

DETAILED DESCRIPTION

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention takes advantage of the discovery of the solids mixing behavior in a fluid coking reactor vessel so that the hydrocarbon feed is preferentially distributed onto the coke particles that are being transported upwards towards the top of the fluidized bed by fast moving vapour. In particular, the present invention is directed towards optimizing the location of feed nozzles such that the feed is primarily delivered into the distinct central region (core) that has high vapour and low solids concentrations (solids lean) rather than the outer region (annulus) that has low vapour and high solids concentrations (solids dense). The core contains the high upwards velocity gas and solids that will reduce secondary vapour phase cracking. The annulus will contain slow downward velocity solids that will have a plug flow-like motion with minimal hydrocarbon present. The result is transfer line coking without the transfer line pipe. As a result, instead of fouling internal transfer line pipe walls and/or termination plates, the coke is laid down on particles that are removed from the reactor vessel as per normal operation through the cold coke standpipe.

The value of the present invention may be two-fold:

(1) It may further reduce the residence time of vapour immediately flashed from the injected feed, as well as any vapour generated by cracking of the feed pitch molecules will be preferentially stripped because the majority, if not all, of the feed will be exposed to the steam rich core region of the process. The prior art method of feed nozzle insertion did not consider the core. As a result, feed may be currently distributed on solids located closer to, or completely in, the annulus where it will be exposed to higher reactor severity (higher vapour residence time) as it will take time for the reacted vapour to coalesce with high velocity bubbles to exist the dense bed; and (2) If the majority, if not all, the feed is placed into the core, reduced by-passing of wet solids into the stripper and cone of the reactor vessel can be expected since the net flow of solids in the core is upwards. The result is additional solids residence time for wet particles and would contribute to less liquid carry-under, hence reduced fouling of stripper and cone internals.

Figure 1:
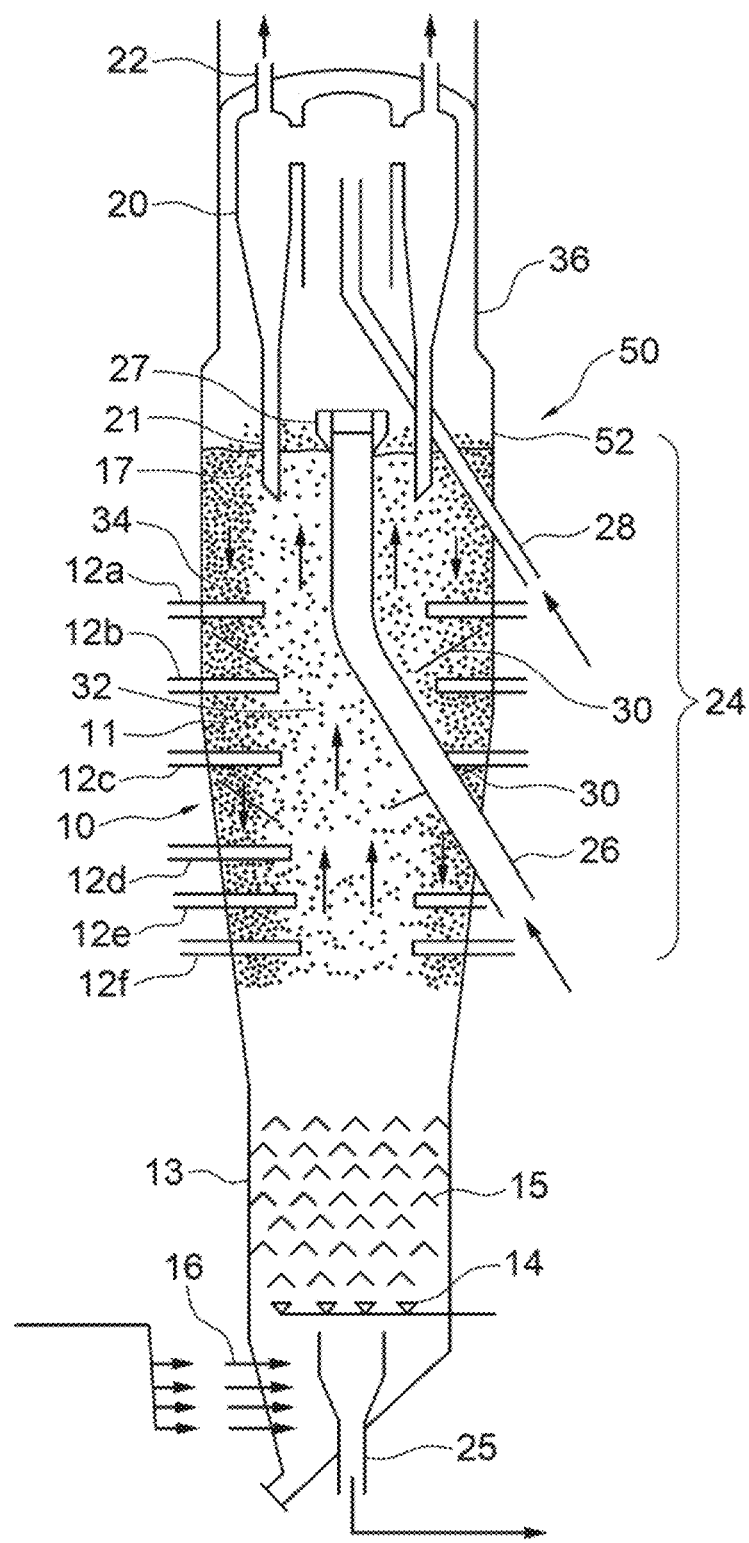
FIG. 1 is a simplified diagram of a fluidized coke reactor of the present invention.

FIG. 1 is a simplified diagram of a fluid coking reactor 50 of the present invention. The reactor 50 comprises a vertically elongated vessel 52 adapted to house a fluidized bed 11 of heated seed coke particles in its mid portion 10, which coke particles are heated to a temperature sufficient to initiate the coking (thermal cracking) reactions. When the hydrocarbon feedstock is added to the fluidized bed 11, the feedstock contacts the coke particles and reacts, and deposits a fresh coke layer on the hot fluidized coke particles circulating in the bed. The fluidized bed of coke comprises a dense bed surface 17, which is static, a dilute core region 32, which is upward flowing, and a dense annular region 34, which is downward flowing.

The feed is injected through multiple nozzles located in feed rings 12a to 12f, located at different elevations, and the nozzles are positioned so that the feed with atomizing steam enters into the fluidized bed of hot coke particles in coking or reaction zone 24. In the present invention, however, feed rings 12a to 12f comprise feed nozzles that are arranged around the circular periphery of the reactor wall such that the tips or ends of the nozzles each extend up to or into the dilute core region 32. It is understood, however, that not all feed rings need to be comprised of extended feed nozzles. For example, it may be sufficient for only feed nozzles 12d, 12e and 12f to have extended feed nozzles.

Steam is admitted as fluidizing gas in the stripping section 13 at the base of coking reactor 50, through spargers 14 directly under stripping sheds 15 as well as from lower inlets 16. The steam passes up into stripping zone 13 of the coking reactor in an amount sufficient to obtain a superficial fluidizing velocity in the coking zone, typically in the range of about 0.15 to 1.5 m/sec (about 0.5 to 5 ft/sec). Steam from the stripper usually generates about 1 ft/s superficial velocity at the top of stripper. Attrition steam takes this to 2 ft/s. The balance of velocity in the bed is provided by hydrocarbon vapour and feed nozzle steam. Typically, fluidizing gases are 50% steam/50% hydrocarbon at the top of the bed. The coking zone is typically maintained at temperatures in the range of 450 to 650° C. (about 840 to 1200° F.) and a pressure in the range of about 0 to 1000 kPag (about 0 to 145 psig), preferably about 30 to 300 kPag (about 5 to 45 psig), resulting in the characteristic conversion products which include a vapour fraction and coke which is deposited on the surface of the seed coke particles.

The vaporous products of the cracking reactions with entrained coke particles pass upwards out of the reaction zone 24, through a phase transition zone in the upper portion 36 of the vessel and finally, a flow distribution zone at the inlets of cyclones 20 (only two shown, one indicated). The coke particles separated from the vaporous coking products in the cyclones are returned to the fluidized bed of coke particles through cyclone dipleg(s) 21 while the vapours pass out through the gas outlet(s) 22 of the cyclones into the scrubbing section of the reactor (not shown). After passing through scrubbing section which is fitted with scrubbing sheds in which the ascending vapours are directly contacted with a flow of fresh feed to condense higher boiling hydrocarbons in the reactor effluent (typically 525° C.+/975° F.+) and recycles these along with the fresh feed to the reactor. The vapours leaving the scrubber then pass to a product fractionator (not shown). In the product fractionator, the conversion products are fractionated into light streams such as naphtha, intermediate boiling streams such as light gas oils and heavy streams including product bottoms.

The coke particles that pass downwards from the dense bed 11 to stripper section 13 comprising sheds 15 are partially stripped of occluded hydrocarbons in the stripper by use of a stripping gas, usually steam, which enters via spargers 14. The stripped coke particles are passed via line 25 to a heater (not shown) which is operated a temperature from about 40 to 200° C., preferably about 65 to 175° C., and more preferably about 65 to 120° C. in excess of the actual operating temperature of the coking zone and recycled back to the fluid coking unit via coke return line 26. A second return line 28 may also be used to introduce hot coke particles higher up in reactor 50. These hot coke particles are often referred to as "scouring coke" to reduce cyclone fouling.

Figure 2:
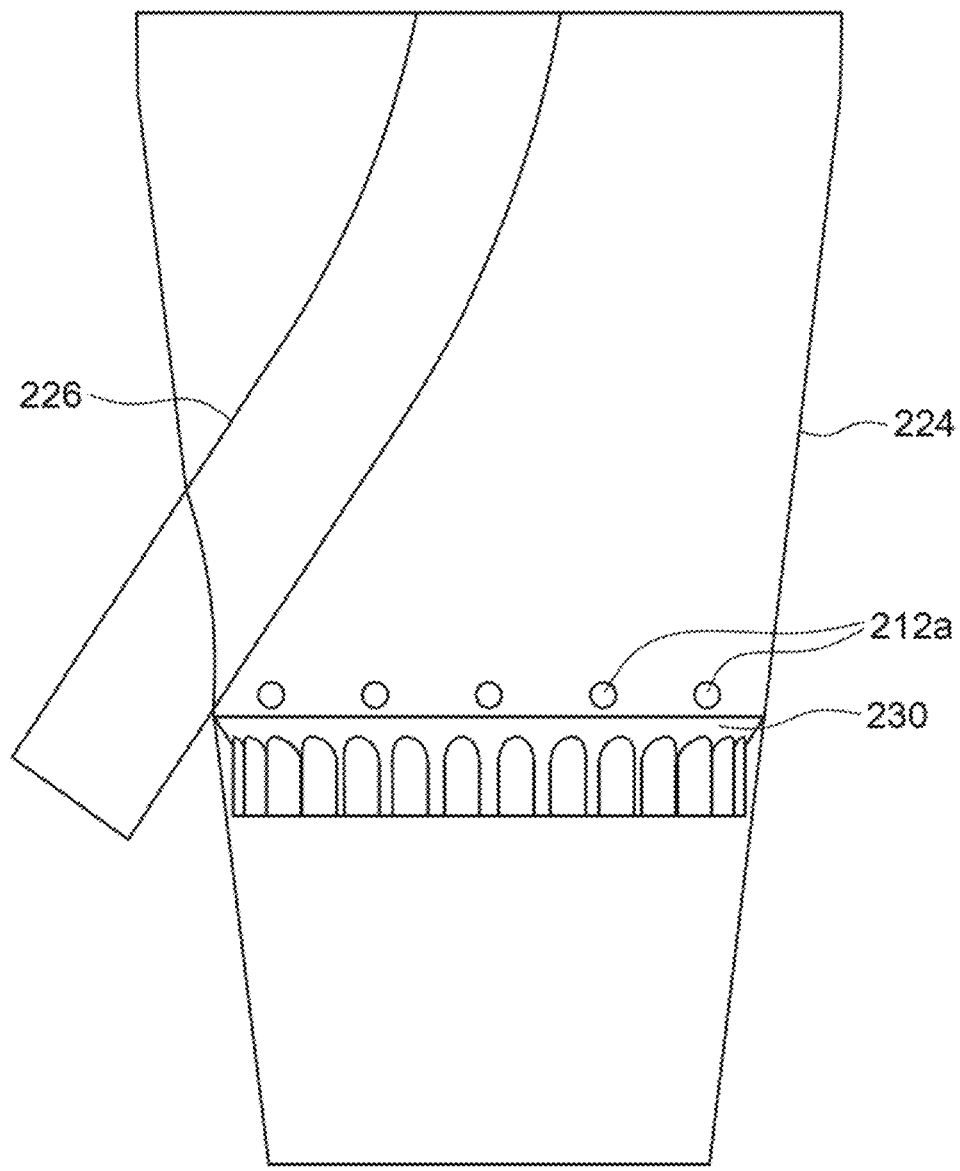
FIG. 2 shows the placement of baffle(s) in the fluidized bed area of a fluidized coke reactor.

To further reduce the residence time of products produced in the annular region 11, wall baffles 30 may be placed in the reaction zone 24. The wall baffles 30 move the downwardly flowing solids in the annular region 34 off the wall of the vessel and then removes interstitial evolved product into the core region 32 for rapid release. FIG. 2 shows a frustoconical staging baffle 230 in the reaction section 224 of a coking vessel which depends from its upper edge at the reactor wall to extend downwards and radially inwards from the reactor wall to a lower, inner edge defining a central, circular aperture. Baffles useful in the present invention typically extend downwards and inwards from the reactor wall at an angle of between 30° and 60° from the horizontal. Above baffle 230 are nozzles 212a, which are the nozzles positioned directly below coke return line 226.

Example 1

A $1/19^{th}$ scaled commercial coker cold flow model was used to demonstrate that solids in a reactor generate a distinct core-annular flow structure. This was accomplished by inserting the feed nozzles (simulated by air jets) such that their maximum jet penetration reached the centerline (r=0) of the fluidized bed. The result was no measurable change in vapour residence time and significant increase in solids residence time in the reactor model. The slower moving solids suggest a more distinct core-annular flow structure. No change in the model vapour phase residence time is reasonable, since the vapour phase already rises quickly.

Experiments conducted with respect to feed-solids contact also supports injecting feed liquid into the core-annular flow structure. Liquid injection into a solids mixing regime representing the core region was vastly improved compared to the same injection done into a regime representing the annulus region. Surprisingly, the poor reaction performance when injecting into the annulus region could not be reversed through exposure to the core regime. This is because the initial liquid contacting is critical to completing the reaction.

It was further discovered that contacting the feed with solids in the core will liberate feed components that can vaporize and some immediate reaction products. However, once the feed/solids mixture exits the core, it will enter the annulus region and begin its migration slowly downward evolving vapour products. It was further discovered that if these products are not properly stripped, excess coke and gas will be made.

Example 2

Experiments were performed using the $1/8^{th}$ scaled commercial coker cold flow model and using helium as a steam tracer in the coker reactor section. Four different parameters were studied: Parameter 1 is where the nominal feed nozzles are positioned (i.e., extended) as currently used in commercial fluid cokers (the base case); Parameter 2 is where the nominal feed nozzles are extended to the core of the reactor; Parameter 3 is where the nominal feed nozzles are extended to the core of the reactor and one wall baffle is added; and Parameter 4 is where the nominal feed nozzles are extended to the core of the reactor and two wall baffles are added. As in applicant's commercial cokers, six (6) feed rings were used, each feed ring having a number of feed nozzles ranging from twelve (12) to eighteen (18).

Table 1 below compares the length of nozzles in the $1/8^{th}$ scale commercial coker for the base case, i.e., the position of nozzle tips in commercial operations (Parameter 1), and the position of nozzles tips of the present invention (Parameter 2). R is the local reactor radius at each of the feed ring elevations, L is the estimated nozzle jet penetrations and $D_N$ is the reactor insertion distance of the nozzles.

TABLE 1

| | Nozzle ring | No. nozzles | Local reactor radius (R) [mm] | Reactor insertion distance ($D_N$) [mm] | Normalized distance from jet tip to reactor centerline: (R-L-$D_N$)/R |
|---|---|---|---|---|---|
| Base Case (Parameter 1) | Feed ring 1 | 18 | 508 | 116 | 0.43 |
| | Feed ring 2 | 18 | 487 | 109 | 0.41 |
| | Feed ring 3 | 16 | 459 | 112 | 0.37 |
| | Feed ring 4 | 16 | 431 | 103 | 0.33 |
| | Feed ring 5 | 12 | 402 | 100 | 0.28 |
| | Feed ring 6 | 12 | 374 | 73 | 0.22 |
| Present Invention (Parameter 2) | Feed ring 1 | 18 | 508 | 334 | 0.00 |
| | Feed ring 2 | 18 | 487 | 306 | 0.00 |
| | Feed ring 3 | 16 | 459 | 280 | 0.00 |
| | Feed ring 4 | 16 | 431 | 244 | 0.00 |
| | Feed ring 5 | 12 | 402 | 212 | 0.00 |
| | Feed ring 6 | 12 | 374 | 157 | 0.00 |

Figure 3:
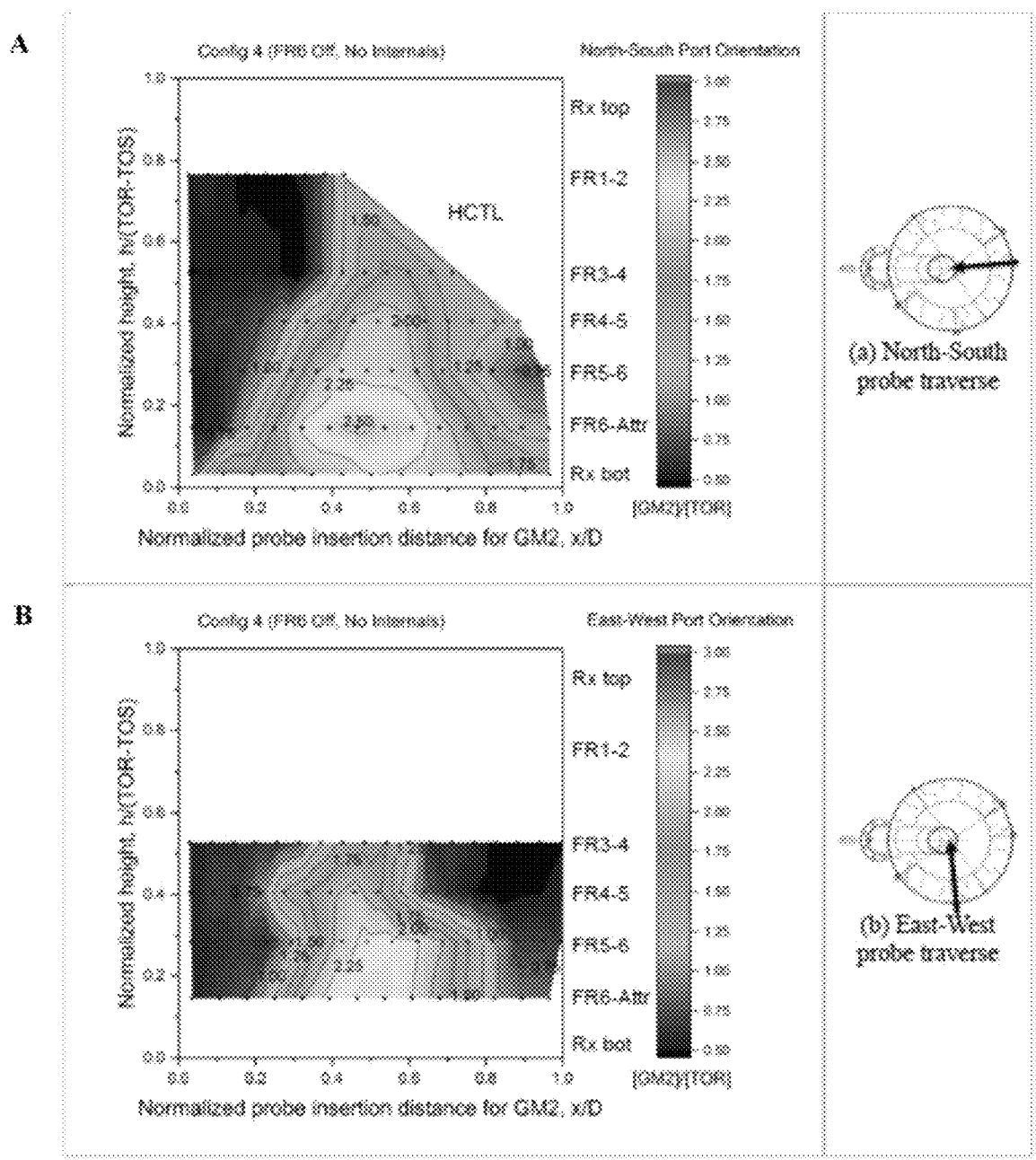
FIGS. 3A (North-South probe traverse) and 3B (East-West probe traverse) show the results of a $\frac{1}{8}^{th}$ scaled commercial coker cold flow model using helium as a steam tracer in the coker reactor section, where the nominal feed nozzles are positioned (i.e., extended) as currently used in commercial fluid cokers (the base case).

FIGS. 3A and 3B show the results for Parameter 1, the base case. It can be seen in both FIGS. 3A and 3B that the annular region is dark blue to black, which is indicative of an area where very little steam is able to penetrate. The core, on the other hand, is green to yellow, which indicates good steam penetration in the core. This shows the core-annular properties of the reactor bed as predicted by the present applicant. This shows a relatively high concentration of steam in the core (referred to as steam rich) and a relatively low steam concentration in the annulus (referred to as steam lean).

Figure 4:
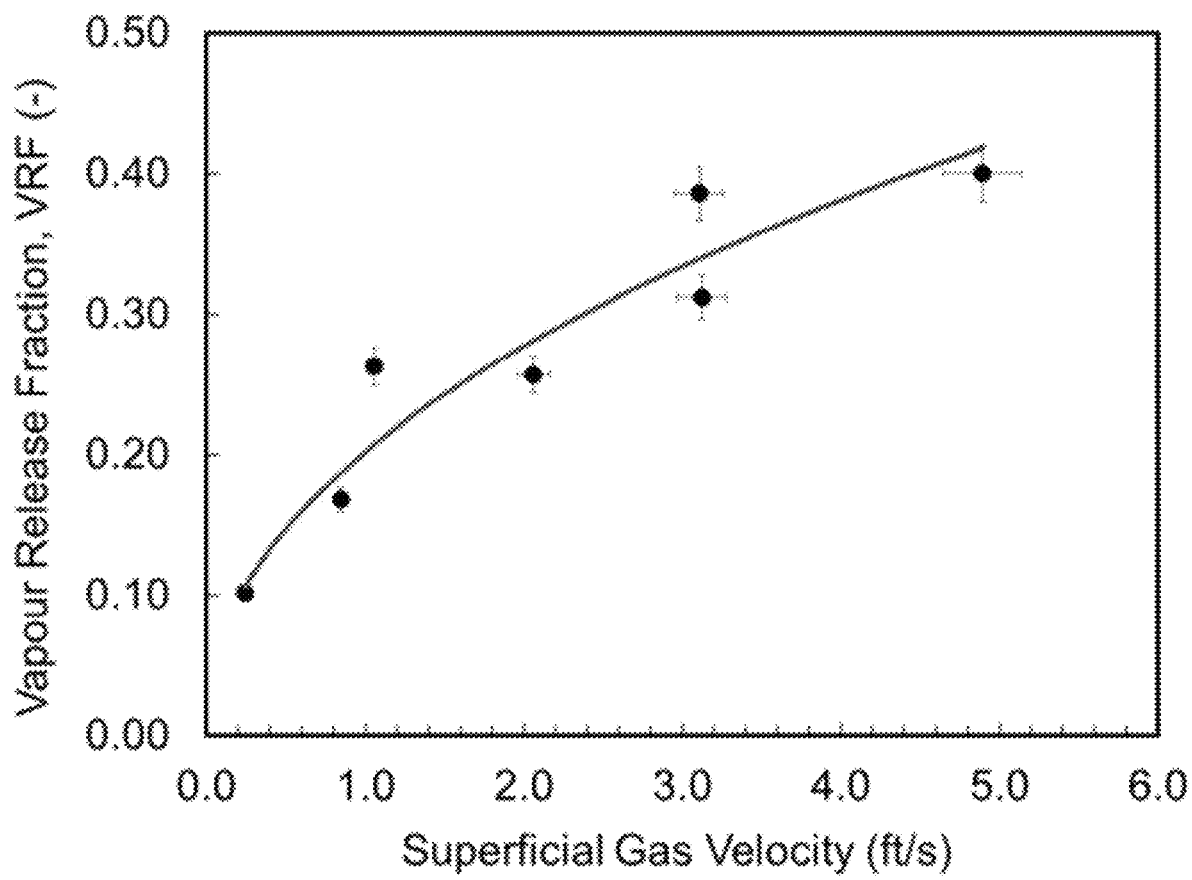
FIG. 4 is a graph showing the relationship of vapour release fraction (VRF (–)) as a function of increasing superficial gas velocity (ft/s).

Separate testing sprayed a model compound of non-volatile wax and volatile heptane scaled to represent heavy residual oil (also referred to as resid or pitch) into a fluidized bed. FIG. 4 shows that the rate of vapour release from a wax-heptane liquid film is increased with increasing superficial gas velocity, where increased superficial gas velocity represents increased solids velocity and a higher volumetric gas flow rate. Currently, the feed nozzles are positioned along the height of the reactor where the nozzle tips are in the annulus region of the reactor. The present invention placed the nozzle tips into the reactor core where solids velocity and steam volumes are much higher. By doing so, the initial volume of vapour released from the feed is increased, which maximized the initial yield captured from the process by flashing off the lightest hydrocarbons in the feed.

Once the feed is injected into the bed and the initial hydrocarbon vapours are flashed and stripped, the remainder of the liquid feed is dispersed onto particles and further reacts. In the case of wet particles in the core, they are carried via the steam to the top of the reactor where they contact the hot coke and are nominally transported to the uppermost portion of the annulus region of the reactor. At this point, the wet solids generally move down the annulus to the bottom of the reactor where they are mixed back into the core. With nominally placed feed nozzles, the velocity of wet solids moving downward through the annulus is measured to be 1.4 ft/s in a scaled cold flow model of the reactor. With the feed nozzles tips inserted into the core, the annulus velocity measured in the cold flow model slowed to 0.9 ft/s. The benefit of a slower moving annulus is that the wet solids have more time to react, which further reduces the extent of liquid carryunder out of the bottom exit of the reactor. The result is an operation where the reactor temperature can be decreased to achieve a higher liquid yield while maintaining a given rate of liquid carryunder. This yield benefit of inserting the feed nozzles to the core is summarized in Table 2, below.

TABLE 2

| Configuration | Downward solids velocity in annulus* (ft/s) | Predicted change in product liquid yield (% LV) |
|---|---|---|
| Nominal feed nozzles | 1.4 | — |
| Nominal feed nozzles extended to core | 0.9 | 1.4 |

Thus, wetted solids and hot coke move to the annulus and proceed downward. When feed nozzles are extended to the core, the annular solids downward velocity is lower, giving the wetted particles and hot coke more time to evolve gaseous products before leaving to the stripper thereby improving liquid yield.

Figure 5:
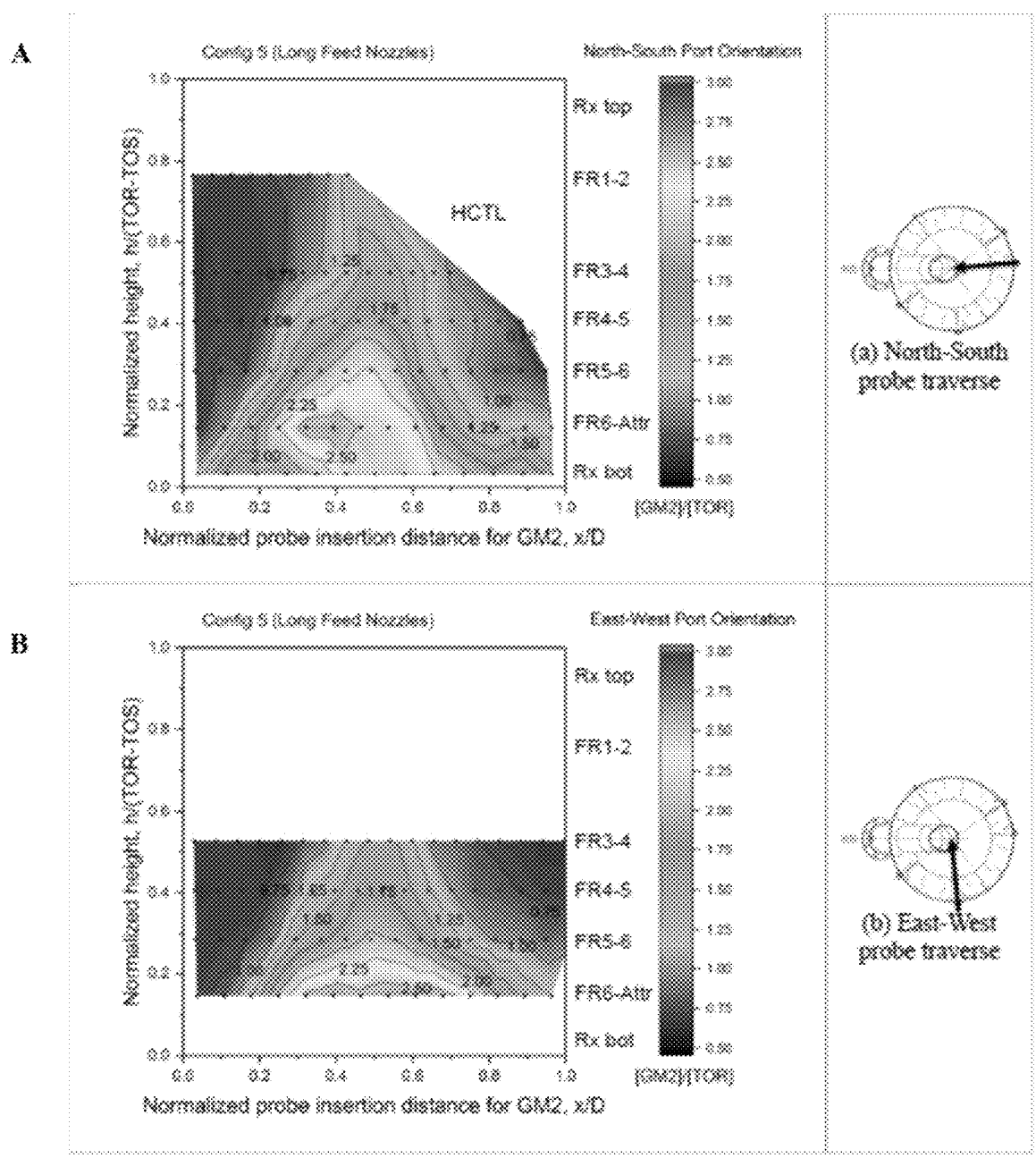
FIGS. 5A (North-South probe traverse) and 5B (East-West probe traverse) show the results of a $\frac{1}{8}^{th}$ scaled commercial coker cold flow model using helium as a steam tracer in the coker reactor section, where the nominal feed nozzles are extended to the core of the reactor.

FIGS. 5A and 5B show the concentration of steam relative to the exit concentration modeled using helium in a scaled cold flow model of the coker reactor section with feed nozzles extended so that feed nozzle jet issues in the core of the reactor. When nominal feed nozzles were extended to the core (Parameter 2), it can be seen in FIGS. 5A and 5B that the annular region became a lighter blue and all of the black was gone, indicating that more steam would be able to penetrate the annular region. Further, by moving the feed nozzles inward, this allows the feed bitumen to be spread on particles in a high gas velocity zone thereby improving contacting and initial vapour release (compared to a low gas velocity annulus as currently practiced).

In comparison to FIGS. 3A and 3B, the relative steam concentration in the annulus, as shown in FIGS. 5A and 5B, increases by as much as 50% due to the nozzle extension into the core (<0.50 versus 0.75). This means relative to the nominal feed nozzle position, steam stripping in the annulus is enhanced by extending the feed nozzle tips into the core. This increased steam flow to the annulus occurs because the vapours and solids must maintain pressure balance through fluidization. As a result, more of the steam entering from the bottom of the reactor must move to the annulus to rebalance the shift of vapour traffic generated from the feed nozzles injecting into the core versus the annulus. Further, wetted solids move upward and contact the hot coke entering the vessel through the hot coke transfer line, thereby helping to dry the wetted solids. Finally, with the nozzles extending to the core, wetted solids and hot coke are contacted with stripping steam to remove gaseous products, thereby increasing liquid yield. With conventional nozzles, stripping steam moves to the core, bypassing the annulus, and so does not provide the desired stripping.

Figure 6:
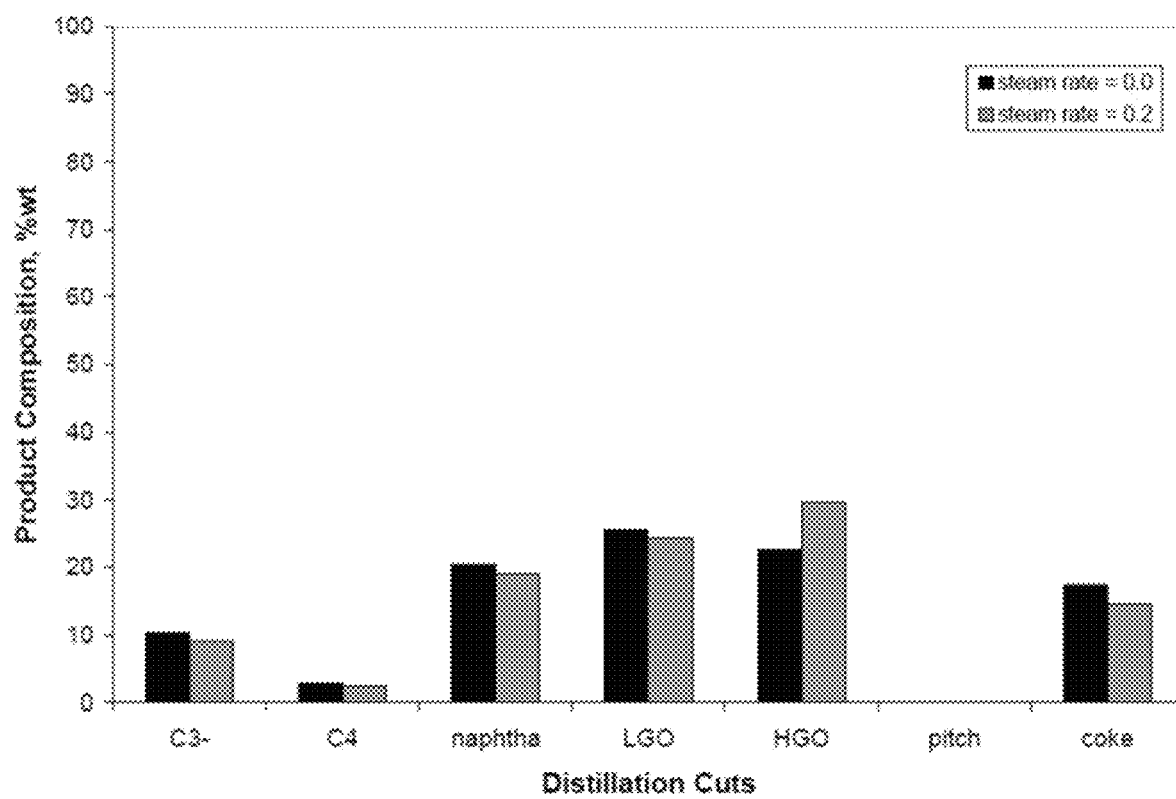
FIG. 6 is a bar graph showing the product composition (% wt) of distillations cuts when the steam rate is zero (0) higher than base and when the steam rate is 0.2 higher than base.

Even though annular stripping is improved in this embodiment, additional means to improve annular stripping may further improve the overall liquid product yield from the process. Liquid product yield is limited by its vapour-liquid equilibrium. FIG. 6 shows an example of the effect relative volatility can have on product yield when cracking pitch. In this example, steam dilution is used to increase relative volatility. The model shows an increase in the sum of butanes (C4), naphthas, heavy gas oil (HGO) and light gas oil (LGO) yield, which can be referred to as liquid product yield, and a reduction in coke yield as steam is added to the reaction environment.

Figure 7:
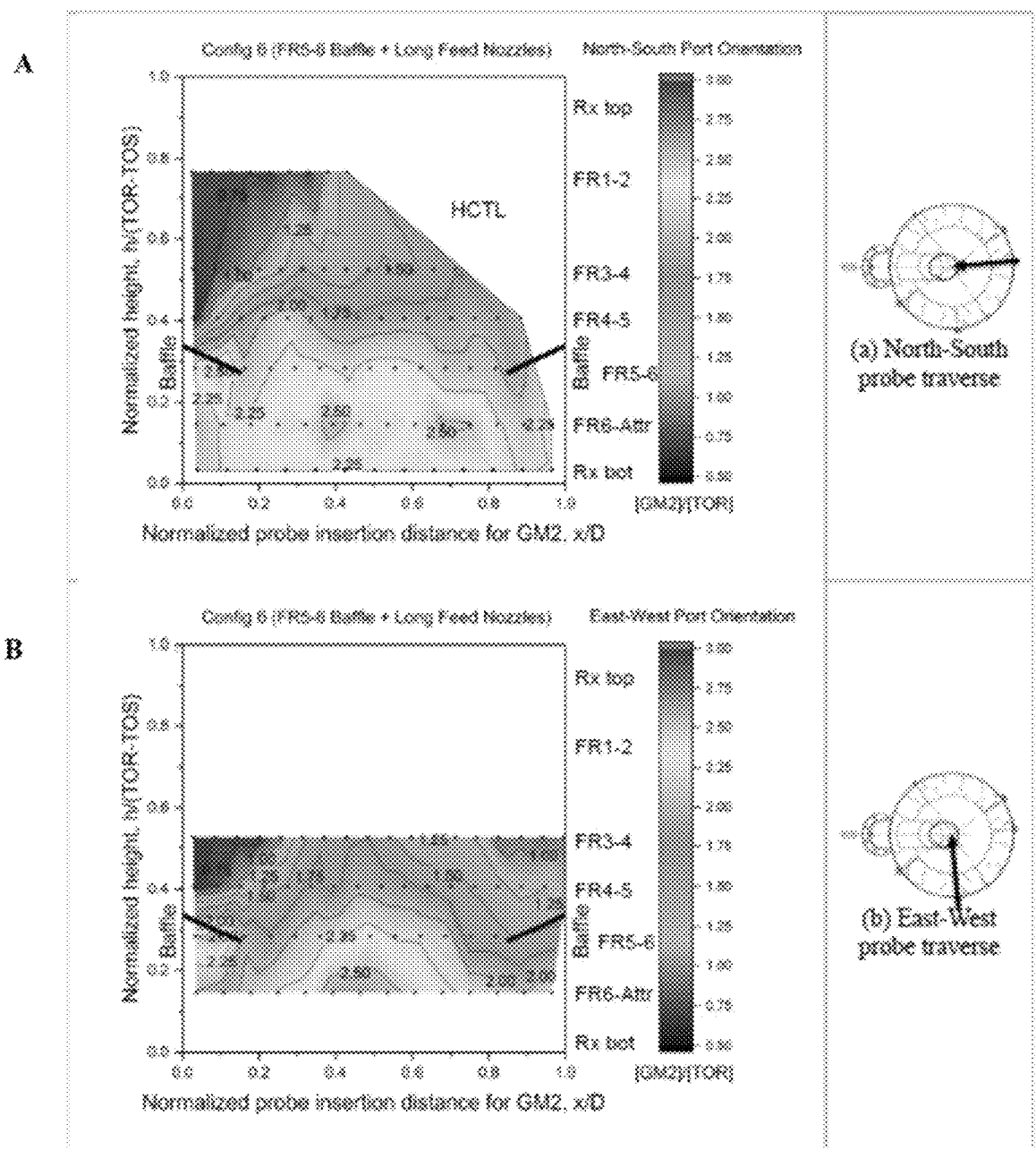
FIGS. 7A (North-South probe traverse) and 7B (East-West probe traverse) show the results of a $\frac{1}{8}^{th}$ scaled commercial coker cold flow model using helium as a steam tracer in the coker reactor section, where the nominal feed nozzles are extended to the core of the reactor and one wall baffle is added.
Figure 8:
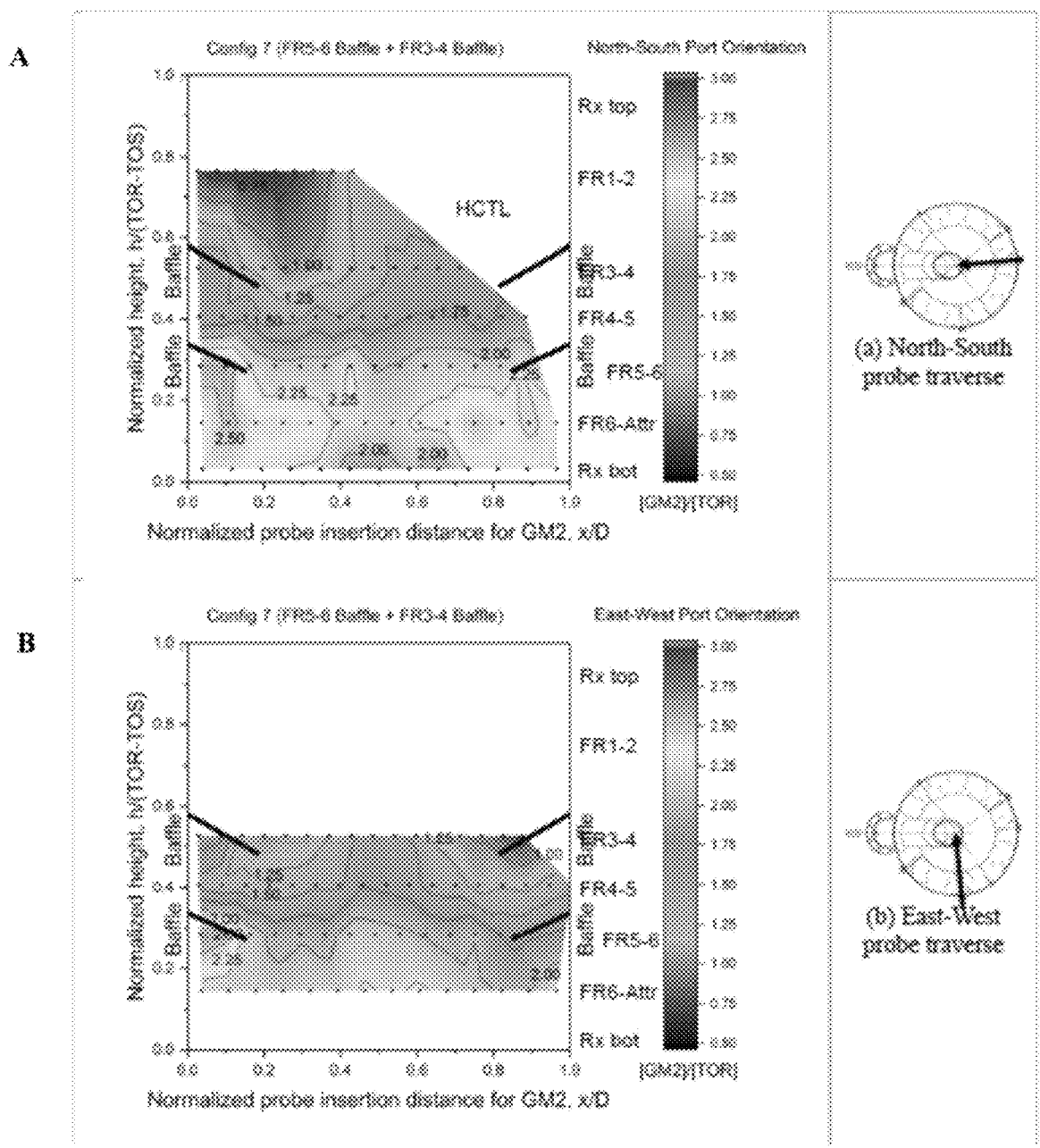
FIGS. 8A (North-South probe traverse) and 8B (East-West probe traverse) show the results of a $\frac{1}{8}^{th}$ scaled commercial coker cold flow model using helium as a steam tracer in the coker reactor section, where the nominal feed nozzles are extended to the core of the reactor and two wall baffles are added.

One embodiment that further improves hydrocarbon stripping while maintaining the core structure in the fluidized is using feed nozzles extended so that feed nozzle jet issues in the core of the vessel and a wall baffle below the bottommost feed ring. FIGS. 7A and 7B show the concentration of steam relative to the exit concentration modeled using helium in a scaled cold flow model of the coker reactor section. The relative steam concentration at the wall below the wall baffle has increased from being steam lean (<0.75) to steam rich (>2.0). Steam dilution at the wall can be extended further up the reactor with an additional baffle (FIGS. 8A and 8B). Commercial data supports these experimental findings. Less reactor wall fouling occurs below a wall baffle. This reduction in fouling confirms a decrease in coke yield. With nozzles extended to the core and baffles added (1, 2, or 3), wetted solids and hot coke are better contacted with stripping steam to remove gaseous products increasing liquid yield.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A fluidized coke reactor comprising a vertically elongated vessel adapted to house a fluidized bed of heated coke particles in its mid portion, the fluidized bed having a high velocity core region comprising upwardly flowing coke particles and a low velocity annular region comprising downwardly flowing coke particles, for converting a heavy hydrocarbonaceous feedstock to liquid products, further comprising:

a plurality of feed nozzles, each feed nozzle having a tip, positioned in the fluidized bed of the vessel, each nozzle tip extending into the high velocity core region for delivering the hydrocarbon feedstock into the high velocity core region.

2. The fluidized coke reactor as claimed in claim 1, further comprises at least one internal reactor wall baffle located in the fluidized bed.

3. The fluidized coke reactor as claimed in claim 2, wherein the at least one baffle is a frusto-conical baffle.

4. The fluidized coke reactor as claimed in claim 2, in which each internal wall baffle extends downwards and inwards from the reactor wall at an angle of between 30° and 60° from the horizontal.

5. The fluidized coke reactor as claimed in claim 1, wherein the plurality of feed nozzles are attached to at least one feed ring.

6. The fluidized coke reactor as claimed in claim 5, comprising six feed rings.

7. A process for converting a heavy hydrocarbonaceous feedstock to liquid products, comprising:

introducing the hydrocarbonaceous feedstock into a fluidized bed of heated coke particles, the fluidized bed having a high velocity core region comprising upwardly flowing coke particles and a low velocity annular region comprising downwardly flowing coke particles, the hydrocarbonaceous feedstock being introduced into the high velocity core region of the fluidized bed through a plurality of feed nozzles, each nozzle having a tip, each nozzle tip extending into the high velocity core region, and allowing the hydrocarbonaceous feedstock to primarily react with the upwardly flowing coke particles for rapid release of product.

\* \* \* \* \*